(12) United States Patent
Horton

(10) Patent No.: US 7,201,363 B2
(45) Date of Patent: Apr. 10, 2007

(54) VALVE

(75) Inventor: David R. Horton, Drummoyne (AU)

(73) Assignee: Global Valve Technology Pty Ltd., North Sydney, NSW (AU)

( * ) Notice: Subject to any disclaimer, the term of this patent is extended or adjusted under 35 U.S.C. 154(b) by 83 days.

(21) Appl. No.: 10/503,283

(22) PCT Filed: Jan. 30, 2003

(86) PCT No.: PCT/AU03/00097

§ 371 (c)(1),
(2), (4) Date: Mar. 3, 2005

(87) PCT Pub. No.: WO03/064903

PCT Pub. Date: Aug. 7, 2003

(65) Prior Publication Data

US 2005/0167631 A1     Aug. 4, 2005

(30) Foreign Application Priority Data

Jan. 30, 2002 (AU) .................................... PS 0245
May 27, 2002 (AU) .................................... PS 2593

(51) Int. Cl.
*F16K 1/00* (2006.01)
(52) U.S. Cl. .................. 251/331; 251/129.17; 251/360
(58) Field of Classification Search .......... 251/129.17, 251/331
See application file for complete search history.

(56) References Cited

U.S. PATENT DOCUMENTS 3,095,905 A *  7/1963  Glauber ................. 137/625.33
3,155,107 A * 11/1964  Woodford ................... 137/218
3,822,720 A    7/1974  Souza ....................... 137/525.1
4,240,630 A   12/1980  Hoffman ....................... 273/61
4,387,879 A    6/1983  Tauschinski .............. 251/149.1
4,426,062 A    1/1984  Bowron ......................... 251/7
5,244,184 A *  9/1993  Larseneur ................... 251/294
5,685,494 A * 11/1997  Kubach et al. .......... 239/585.5

(Continued)

FOREIGN PATENT DOCUMENTS

EP          0 167 274        1/1986

(Continued)

OTHER PUBLICATIONS

International Preliminary Examination Report, International Application No. PCT/AU00/00659, International Filing Date of Jun. 14, 2000.

(Continued)

*Primary Examiner*—J. Casimer Jacyna
(74) *Attorney, Agent, or Firm*—Welsh & Katz, Ltd.

(57) ABSTRACT

A valve body (12) has an inlet opening (22) and an outlet opening (24) interconnected by a fluid passageway (28, 30) having a flow aperture (34). The valve comprises a diaphragm (14) (typically of the duckbill type) that is located across the flow aperture (34) and has slits in a collapsible aperture (39). This prevents backflow from the outlet to the inlet. The valve has an actuator (16) in the form of a plunger for influencing the fluid flow. Also disclosed is a pressure release valve whereby a high pressure on the outlet side can partially collapse the aperture (39) to temporality vent fluid from the high pressure outlet side.

25 Claims, 18 Drawing Sheets

U.S. PATENT DOCUMENTS 5,769,107 A    6/1998  Woodruff ..................... 137/1
6,752,375 B2*  6/2004  Fukano .................. 251/129.17

FOREIGN PATENT DOCUMENTS

| GB | 2 298 027   | 8/1996 |
| WO | WO 83/02320 | 7/1983 |
| WO | WO 98/01689 | 1/1998 |

OTHER PUBLICATIONS

International Search Report, International Application No. PCT/AU2004/000329.

* cited by examiner

FIG. 2
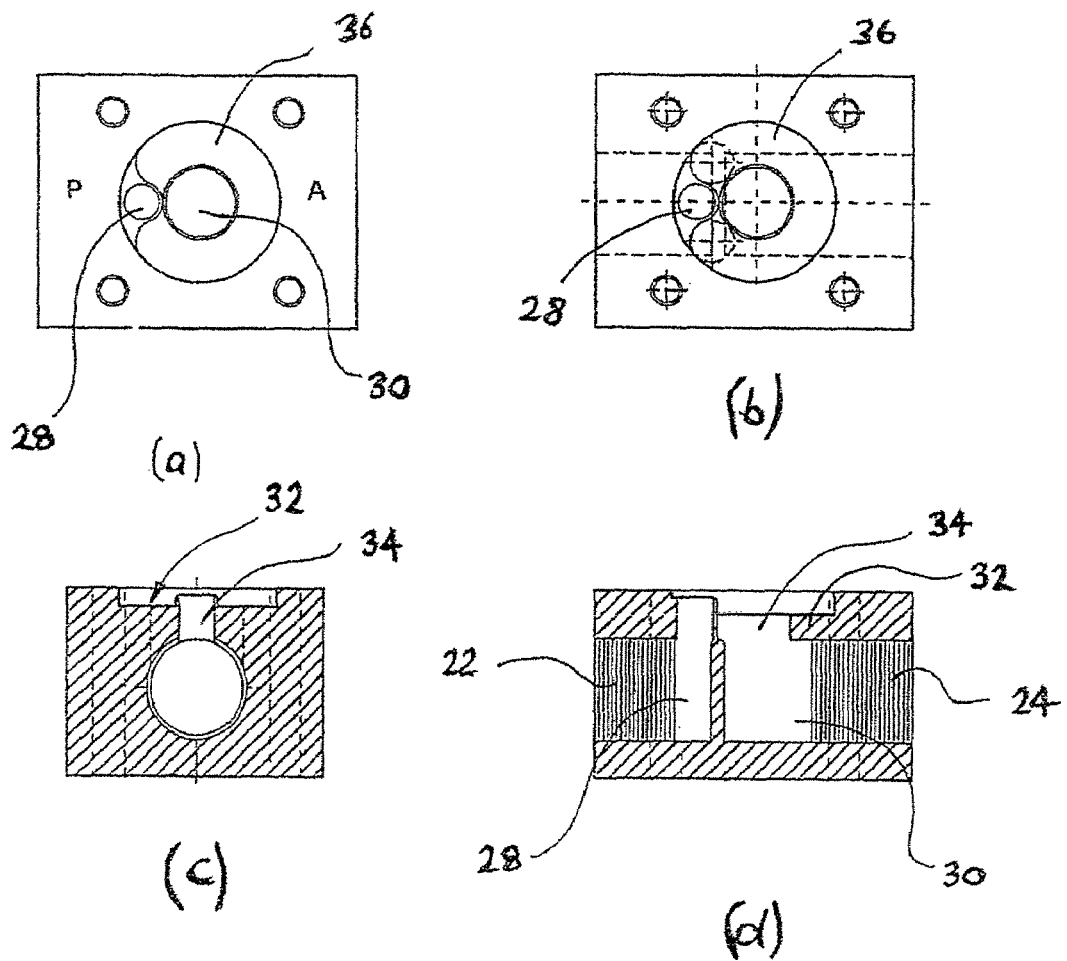
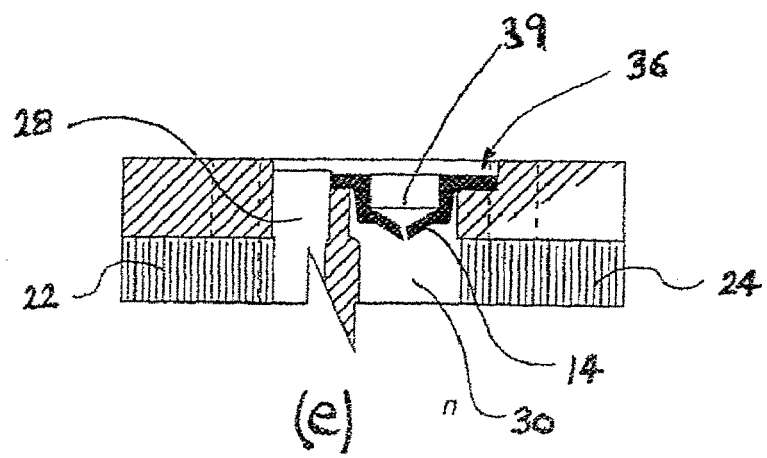

FIG. 3
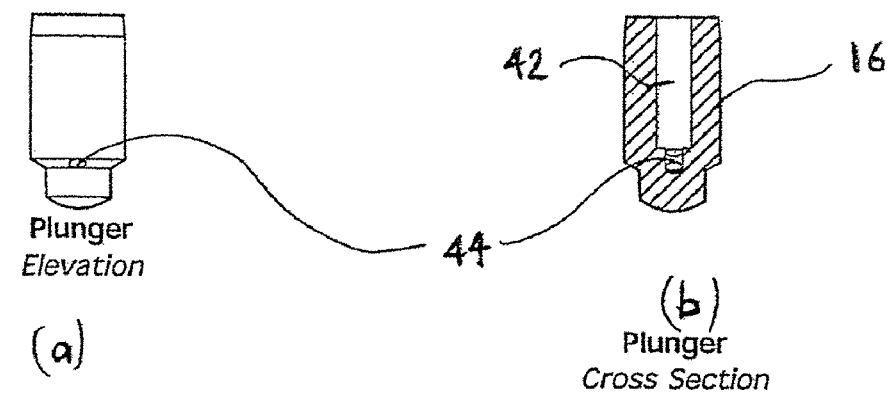
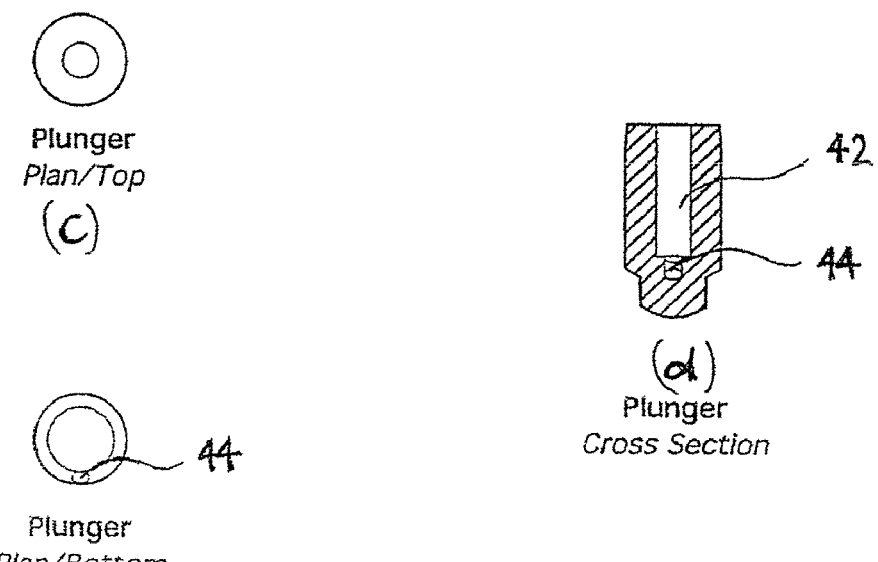
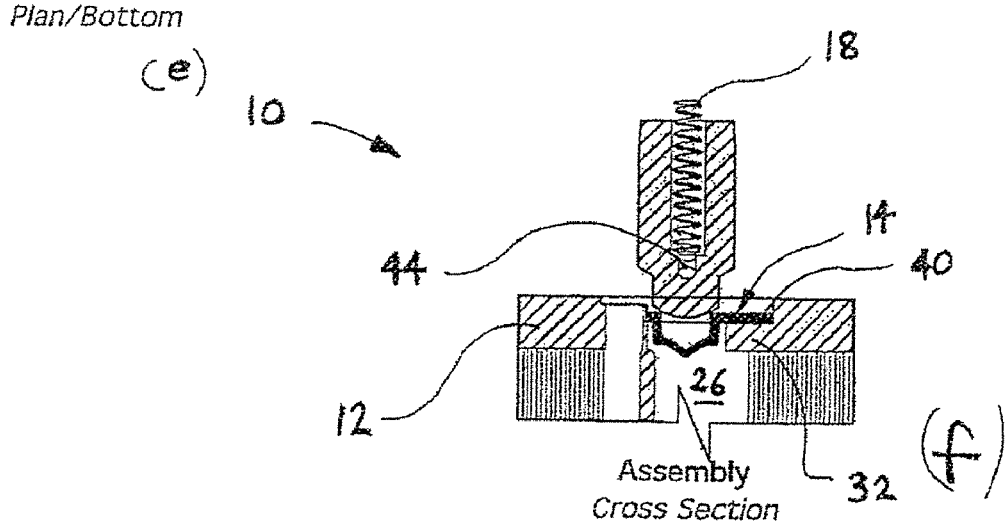

FIG. 4
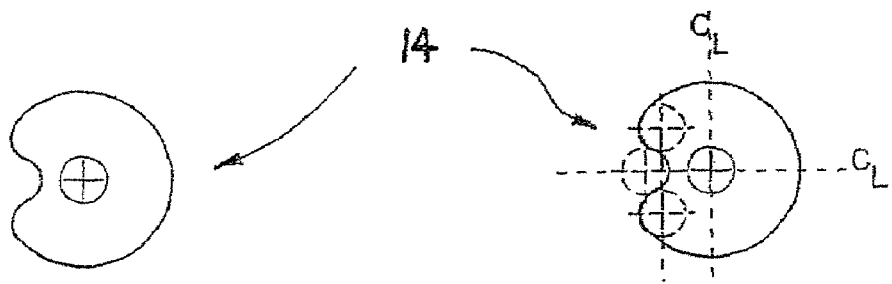
Valve
Plan/Top
(a)
(b)
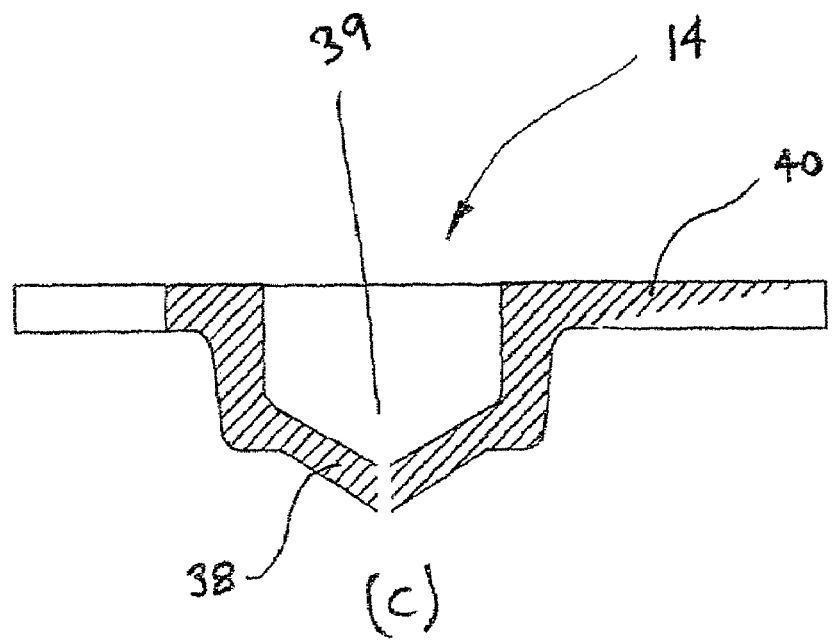
(c)
Valve
Cross Section AA

FIG. 6
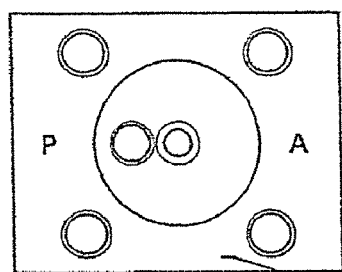
(a)
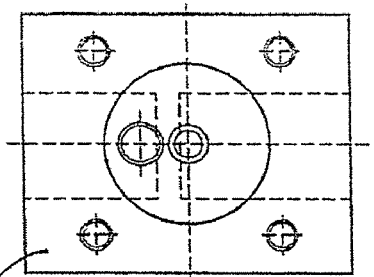
(b)
120
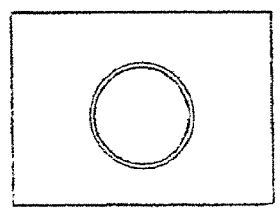
(c)
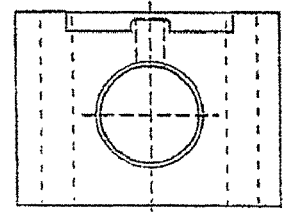
(d)
120
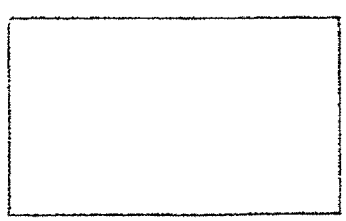
(e)
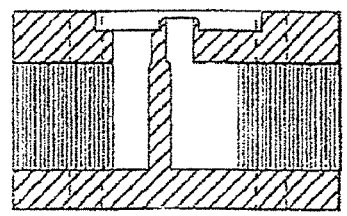
(f)
PRIOR ART (a)　　　　　　　　　(b)

(c)　　　　　　　　　(d)

(e)

(f)

(g)

PRIOR ART

FIG. 8
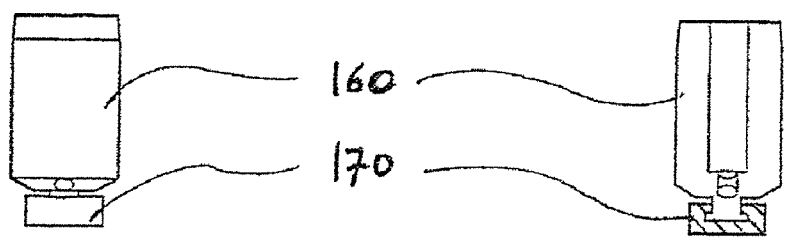
(a)　　　　　　　　　　　　(b)
(c) ○　　　　　　　　　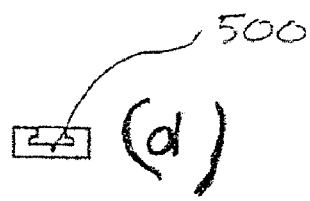 (d)
　　　　　　170
(e) ⊙
PRIOR ART

VALVE

FIELD OF THE INVENTION

The present invention relates generally to a valve and particularly, though not exclusively, to non-return valves and pressure relief valves.

BACKGROUND TO THE INVENTION

Non-return valves are common in industrial and domestic applications and are particularly prolific on pneumatic tyres. A conventional valve typically comprises an inlet casing which is screw threaded within a valve stem of a tyre. The inlet casing houses a shaft along which a valve member slidably moves. The valve member is biased against a seat of the casing under the force of a compression spring so as to close the valve. Such a conventional valve comprises a relatively large number of components, is relatively expensive and complicated in operation.

The applicant discloses in international patent application WO 00/77429 a non-return valve which comprises a conical-shaped diaphragm in a fluid passage way. The diaphragm has a collapsible aperture which has an apex that is orientated in a forward flow direction. The diaphragm itself initiates closure of the collapsible aperture and the closure is further promoted by fluid on the high pressure side of the valve to thus prevent fluid flowing in a reverse direction. When pressure is applied to an inlet side of the diaphragm, the diaphragm deflects to expose the aperture and allow fluid to flow through the passageway from the inlet to the outlet only.

SUMMARY OF THE INVENTION

According to a first aspect of the present invention there is provided a valve comprising:
  a valve body having an inlet opening and an outlet opening interconnected by a fluid passageway having a flow aperture;
  a diaphragm being constructed of a resiliently flexible material and located across the flow aperture and including a collapsible aperture which inhibits flow from the outlet to the inlet openings via the flow aperture in a reverse flow direction and
  a valve actuator for influencing the flow from the inlet to the outlet.

In one embodiment of the present invention a valve seat is disposed about the flow aperture and the valve actuator is at least in part movably coupled to the valve body and arranged to operatively cooperate with the valve seat to effect closure of the flow aperture to prevent flow from the inlet to the outlet openings in a forward flow direction.

In this embodiment the valve actuator preferably comprises a plunger together with a compression spring which urges the plunger into sealed abutment with the valve seat. The plunger may be elongate and configured at one end to abut the valve diaphragm which is seated about the valve seat.

The valve actuator may also comprise a plunger guide tube in which the plunger is slidably housed for reciprocating movement. The actuator preferably also comprises a solenoid actuator which is located about the plunger guide tube and when electrically activated is designed to effect axial movement of the plunger out of abutment with the valve seat to permit flow in the forward flow direction.

The diaphragm preferably is shaped about its periphery substantially complementary to a recess formed in the valve seat to permit seating of the diaphragm relative to the valve seat. The diaphragm most preferably is fixed or adhered to the valve seat. The diaphragm may also be designed to retrofit to a valve.

Preferably, the valve is a flow control valve.

In a second preferred embodiment of the present invention the valve actuator is connected to the diaphragm and is configured so that axial movement of the actuator toward the fluid outlet deflects the diaphragm to expose the aperture and allow fluid to flow through the passageway from the inlet to the outlet or the other way.

In this preferred embodiment the valve actuator may comprise an elongate member formed integrally and generally coaxial with the valve diaphragm, which preferably is conically shaped. Alternatively, the valve actuator may comprise an elongate member having at one end an engaging surface being configured to abut the diaphragm at its inlet side. The valve actuator may also comprise a retaining element coupled to the elongate member and configured to operatively engage the valve body to inhibit axial displacement of the elongate member and its engaging surface and thus deflection of the diaphragm under pressure. In this embodiment the collapsible aperture is in the form of one or more slits each being formed through an axis of the valve and the valve diaphragm is formed integrally with the valve body. The valve body preferably is configured to retrofit to an existing valve stem. Alternatively the valve body may be designed to be sealably inserted into a flow line. Preferably the fluid is water or compressed air.

According to a second aspect of the invention there is provided a diaphragm for a valve comprising a valve body having an inlet opening and an outlet opening interconnected by a flow passageway having a flow aperture, and a valve actuator at least in part being movably coupled to the valve body to effect closure of the flow aperture to prevent flow from the inlet to the outlet openings in a forward flow direction, the diaphragm being located across the flow aperture and comprising a collapsible aperture which inhibits flow from the outlet to the inlet openings via the flow aperture in a reverse flow direction.

The diaphragm that forms a part of the valve according to the first aspect of the invention and the diaphragm according to the second aspect preferably are in the form of a generally conical-shaped diaphragm having the collapsible aperture located at or adjacent its apex which is orientated in the forward flow direction. The collapsible aperture most preferably is in the form of one or more slits each being formed through an axis of the valve.

According to a third aspect of the invention there is provided a pressure relief valve comprising:
  a valve body including a fluid passageway which defines a fluid inlet and a fluid outlet located on a low pressure and a high pressure side of the valve respectively; and
  a valve diaphragm in the form of a conical-shaped diaphragm having a collapsible aperture located at or adjacent its apex, said diaphragm being connected across the fluid passageway and being constructed of a resiliently flexible material wherein the diaphragm initiates closure of the collapsible aperture, the diaphragm being configured whereby excessive pressure on the high pressure side of the valve effects deflection of the diaphragm to expose the collapsible aperture to temporarily vent fluid from the high pressure side.

The collapsible aperture preferably is in the form of one or more slits each being formed through an axis of the valve and its conical-shaped diaphragm.

In one embodiment of the third aspect of the present invention the apex of the diaphragm is oriented in a forward flow direction and directed toward the high pressure side of the valve. A person skilled in the art will appreciate that a pressure release valve may not have a flow in forward direction. In a pressure release valve the forward direction is a direction that opposes a direction in which pressure may be released.

In an alternative embodiment of the fourth aspect of the present invention the apex of the diaphragm is which is oriented in a reverse flow direction and directed toward the low pressure side of the valve.

According to a fourth aspect of the invention there is provided a high pressure non-return valve comprising:

a valve body including a fluid passageway which defines a fluid inlet and a fluid outlet located on a low pressure and a high pressure side of the valve respectively;

a valve diaphragm being connected across the fluid passageway and including a collapsible aperture, said diaphragm being constructed of a resiliently flexible material and being configured so that pressure imposed on the high pressure side of the valve promotes closure of the collapsible aperture to prevent fluid flowing in a reverse direction toward the inlet; and a reinforcing member being disposed across the valve body and designed to operatively engage the diaphragm on its low pressure side whereby the reinforcing member restricts deflection of the diaphragm when a relatively high pressure is applied on the high pressure side of the diaphragm thus maintaining closure of the collapsible aperture and the valve.

In this aspect of the present invention the valve diaphragm is preferably conical-shaped having its apex directed to the outlet and the high pressure side of the valve. The reinforcing member preferably also is conical-shaped and configured to nest within the fluid passageway adjacent the diaphragm on its inlet side. The reinforcing member may comprise a plurality of fluid openings to permit the passage of fluid.

In all aspects of the present invention the diaphragm preferably is constructed of a resiliently flexible polymeric material. The polymeric material most preferably is an elastomer such as a rubber material. Alternatively the polymeric material may be a nylon-based material. The diaphragm of the valves of the first, third and fourth aspect of the present invention may also have a sealing function and may also be used as a seal that may replace a conventional O-ring seal.

BRIEF DESCRIPTION OF THE DRAWINGS

In order to achieve a better understanding of the nature of the present invention a preferred embodiment of a valve will now be described, by way of example only, with reference to the accompanying drawings in which:

FIGS. 2(a) to (e) are a plan and cross sectional views of the valve body together with the diaphragm of the valve of FIG. 1;

FIGS. 3(a) to (f) are elevational and sectional views of the plunger and part of the valve body of the valve of FIG. 1;

FIGS. 4(a) to (c) are a detailed plan and sectional view of the diaphragm of the valve of FIG. 1;

FIGS. 6(a) to (f) are plan, elevational and sectional views of a traditional valve body which may be modified in accordance with that of FIG. 2;

FIGS. 8(a) to (e) are elevational, plan and sectional views of a traditional plunger which is replaced with that of FIG. 3 in the valve;

FIGS. 11(a) to 12(d) are various underside perspective, sectional and plan views of a variant of the non-return valve of FIG. 15 in its closed and open configurations;

FIGS. 12(a) and 12(b) are part sectional views of a further embodiment of the preceding aspect of the non-return valve in its "neutral" and pressurised configurations;

DETAILED DESCRIPTION OF THE PREFERRED EMBODIMENT

Figure 1:
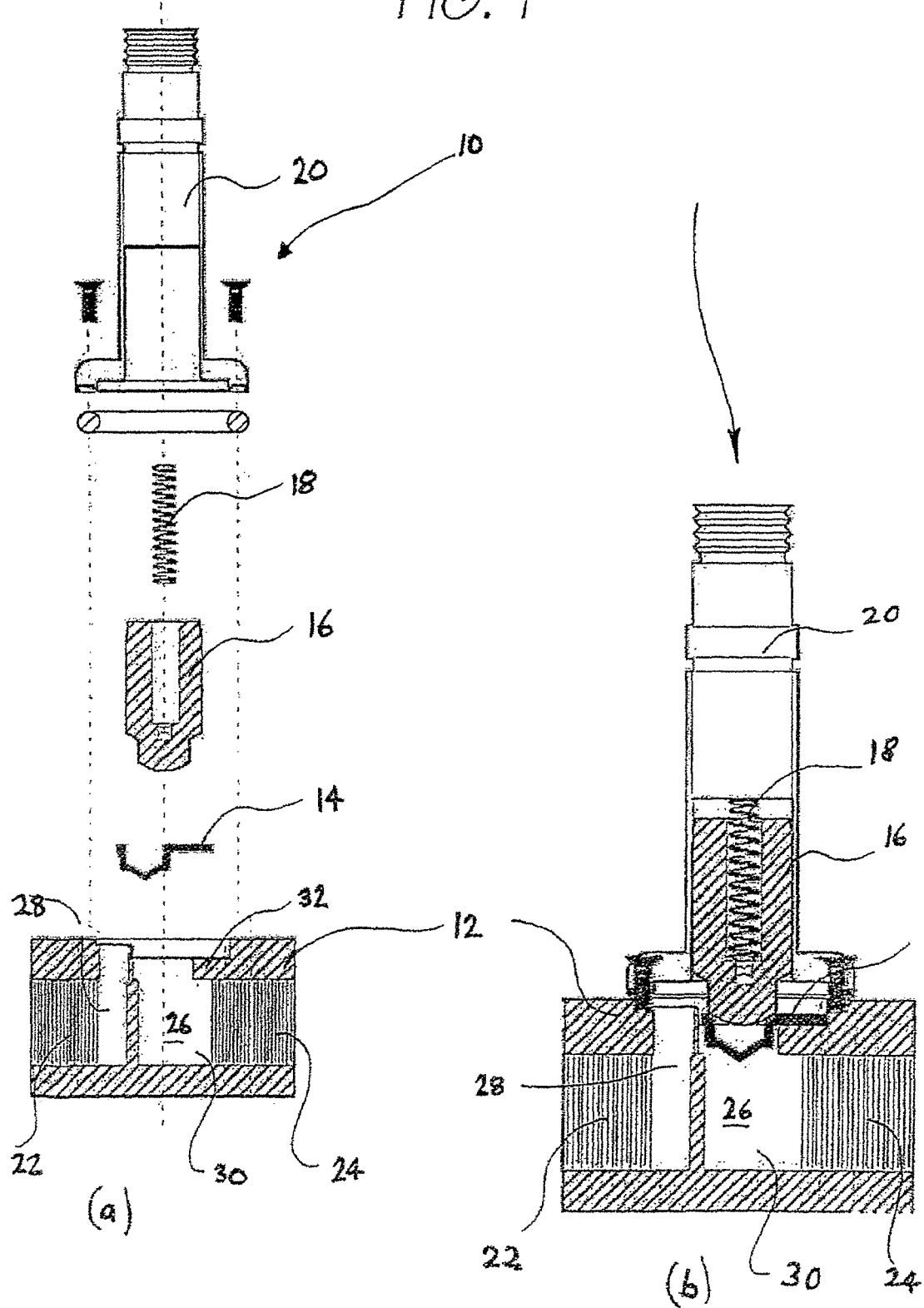
FIGS. 1(a) and (b) are exploded and assembled view of part of a valve incorporating a non-return diaphragm.
Figure 5:
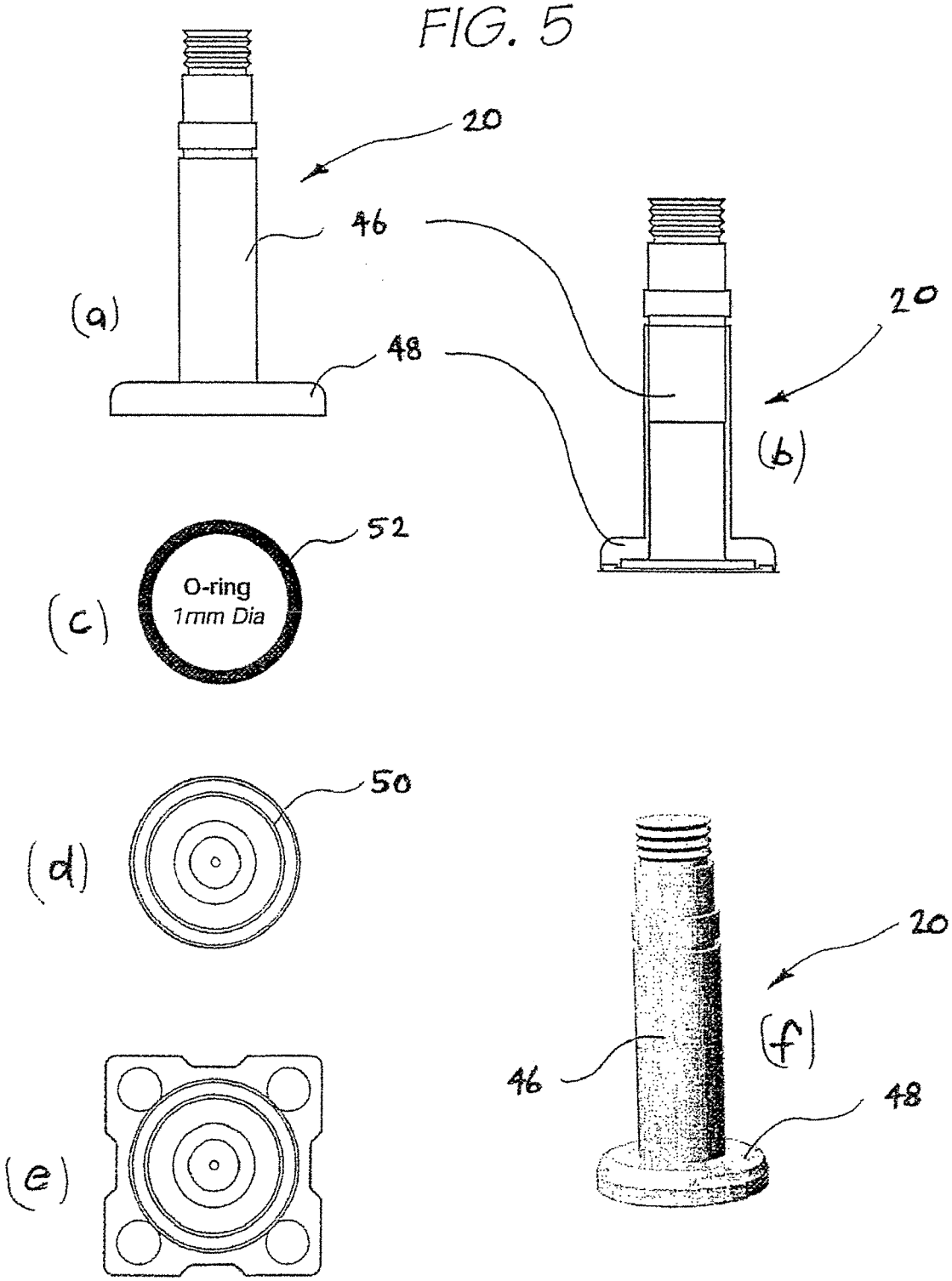
FIGS. 5(a) to (f) are various elevational and plan views of the guide tube of the valve of FIG. 1.
Figure 7:
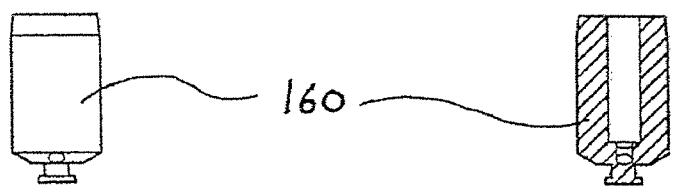
FIGS. 7(a) to (g) are elevational, plan and sectional views of a traditional plunger which is replaced with that of FIG. 3 in the valve.

Initially referring to FIGS. 1(a) and (b), a non-return valve and a diaphragm according to preferred embodiments of the first and second aspects of the present invention are now described. FIG. 1 shows the valve designated generally as 10 comprising a valve body 12, a diaphragm 14, and a valve actuator, in this example being in the form of a plunger 16, compression spring 18 and plunger guide tube 20. Though not illustrated, the valve 10 of this embodiment is solenoid-actuated by means of an electrically activated magnetic coil which is disposed about the guide tube 20.

The valve body 12 of this example includes a fluid inlet 22 and a fluid outlet 24 interconnected by a fluid passageway 26. The fluid inlet and outlet 22 and 24 are defined by threaded and axially aligned ports formed in the valve body 12. The threaded inlet port 22 is formed continuous with a transversely directed inlet flow passage 28 which is adjacent and continuous with another transversely directed fluid passage 30 which in turn is formed continuous with the outlet port 24. The transverse fluid passages 28 and 30 together form the fluid passageway 26.

As best shown in FIGS. 2(a) to (e) the other transverse fluid passage 30 includes a valve seat 32 which defines a flow aperture 34 in the fluid passageway 26. The valve seat 32 includes a recess 36 in which the diaphragm 14 of this embodiment is seated. The diaphragm 14 as best shown in FIG. 4 is shaped about its periphery complementary to the peripheral profile of the recess 36. Otherwise, the diaphragm 14 includes a conical-shaped portion 38 formed continuous and integral with a flange mounting portion 40. The conical-portion 38 includes one or more slits 39 formed at an axis of the diaphragm 14 and defining a collapsible aperture therein. The diaphragm 14 of this example is constructed of a polymeric material in the form of an elastomer such as a rubber material. The diaphragm 14 is otherwise similar in construction and fabricated according to the teachings of the applicant's international patent application number PCT/AU00/00659. The disclosure of this international patent application together with its equivalents is to be included herein by way of reference.

As shown in FIGS. 3(a) to (f) the plunger 16 of this embodiment is generally cylindrical in shape and includes an axial bore 42. The axial bore 42 is designed to house the compression spring 18 which biases or urges the plunger 16 against the diaphragm 14 and the valve seat 32 wherein the valve 10 is closed. The plunger 16 includes a vent aperture 44 which serves to balance any pressure differential between the bore 42 and the fluid passageway 26. The plunger 16 at a distal end is reduced in diameter and dome-shaped in order to seat against the diaphragm 14. The diaphragm 14, and in particular the annular flange portion 40, thus functions as a seal against which the plunger 16 is seated.

The plunger 16 is slidably and axially housed within the guide tube 20 of FIGS. 4(a) to (c) and FIGS. 5(a) to (f). The guide tube 20 includes a tubular housing portion 46 formed continuous with a flanged mounting portion 48. The flanged mounting portion 48 includes a circumferential groove 50 in which an O-ring 52 is located for sealably mounting the guide tube 20 to the valve body 12. The plunger 16 is actuated by means of a magnetic coil (not shown) located about the guide tube 20.

The general steps involved in operation of the valve 10 are as follows:
 i) the valve 10 is maintained in the normally-closed by means of the compression spring 18 which urges the plunger 16 against the diaphragm 14 for closure of the flow aperture;
 ii) the diaphragm 14 functions as a non-return valve which inhibits flow in a reverse direction thus preventing this reverse flow under, for example, conditions of vibration which would otherwise result in movement of the plunger 16 from the valve seat;
 iii) the valve is activated into an open-position by powering the magnetic coil which lifts the plunger 16 clear of the diaphragm 14 and valve seat to allow flow in a forward direction from the inlet 22 to the outlet 24 whilst the diaphragm 14 prevents any reverse flow of fluid.

In this embodiment the valve 10 is modified from an existing control valve which includes the conventional valve body 120 of FIGS. 6(a) to (f) and the plungers 160 of FIGS. 7(a) to (g) and 8(a) to (e). The traditional plunger 160 also includes a resilient sealing element 170 which seals against the valve seat (now designated) of the traditional valve body 120. It has been observed that fluid leakage can occur in this traditional configuration as a result of wear/deformation of the sealing element 170. The valve body 120 and plunger 160 are replaced with the valve body 12 and plunger 16 and the diaphragm 14 retrofitted to the modified valve body 12 of the valve 10.

It will be appreciated by those skilled in the art that the valve according to the described preferred embodiments has at least the following advantages:
 i) the valve provides effective seating/sealing whilst minimising the likelihood of flow in a reverse direction;
 ii) the valve lends itself to maintenance in-situ by means of the non-return diaphragm without requiring isolation valving; and
 iii) the valve and diaphragm lend themselves to retrofitting to existing installations.

It will be appreciated by those skilled in the art that variations of the valves according to the described preferred embodiments are possible. For example, the diaphragm need not be of the configuration and construction described provided it inhibits flow in a reverse direction. The valve need not be a flow control valve and may extend to a range of duties and fluids including liquids and gases. The valve may be manually actuated rather than solenoid actuated as described. The material from which the diaphragm is constructed should be resiliently flexible and may for example be a nylon-base material.

Figure 9:
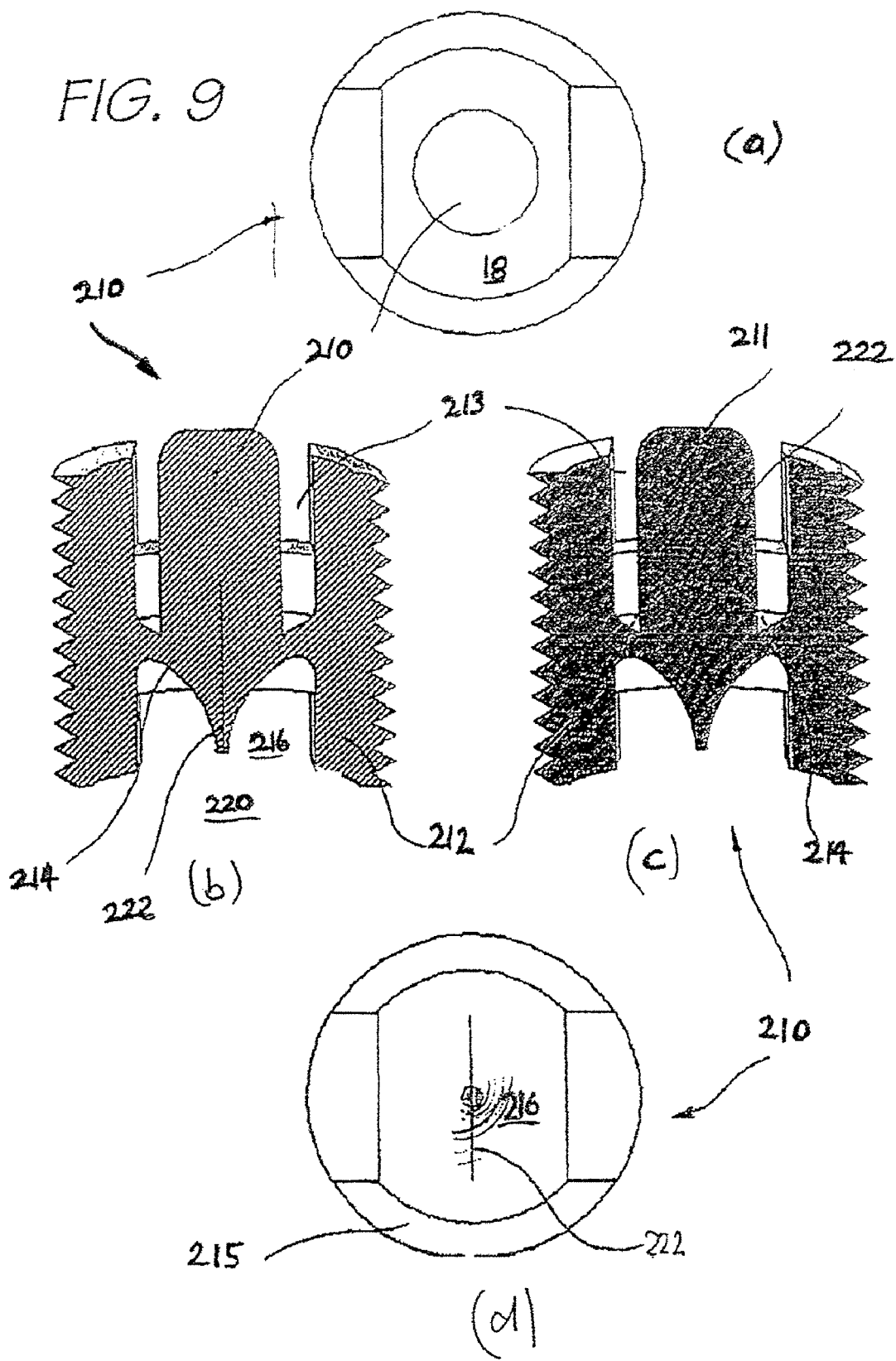
FIGS. 9(a) to (d) are plan and sectional profile views of a non-return valve according to one embodiment of a second aspect of the present invention.

Referring now to FIGS. 9 to 18 valve according to embodiments of the third and fourth aspects of the present invention are now described. FIG. 9 shows a non-return valve 210 including a detent 211 formed integral with and extending in an reverse direction from the valve diaphragm 214. The collapsible aperture 222 is formed as a slit which intersects with the apex of the conical-shaped diaphragm 214 and extends approximately midway into the length of the detent 211. The collapsible slit 222 extends across an annular gap 213 defined between the valve body 222 and the detent 211. The collapsible slit 222 of this example is substantially co-planar with an axis of the valve 210 and the detent 211.

The non-return valve 210 is moulded from a polymeric material, preferably an elastomer such as rubber or a nylon-based material. The selection of the appropriate material for the valve 210 if not obvious to one skilled in the art may require a degree of trial and experimentation.

The valve body 212 includes a pair of opposing step rebates such as 215 which are adapted to receive a tool for screw threaded removal or insertion of the non-return valve 210. In operation, depression of the detent 211 forces the diaphragm 214 apart and the collapsible slit 222 open so as to either purge fluid from the non-return valve 210 or permit the flow of fluid across the valve 210 in a forward direction. The detent 211 provides added rigidity to the diaphragm 214 whilst in use and should be more suited to moulding than the described embodiments of the non-return valve.

Figure 10:
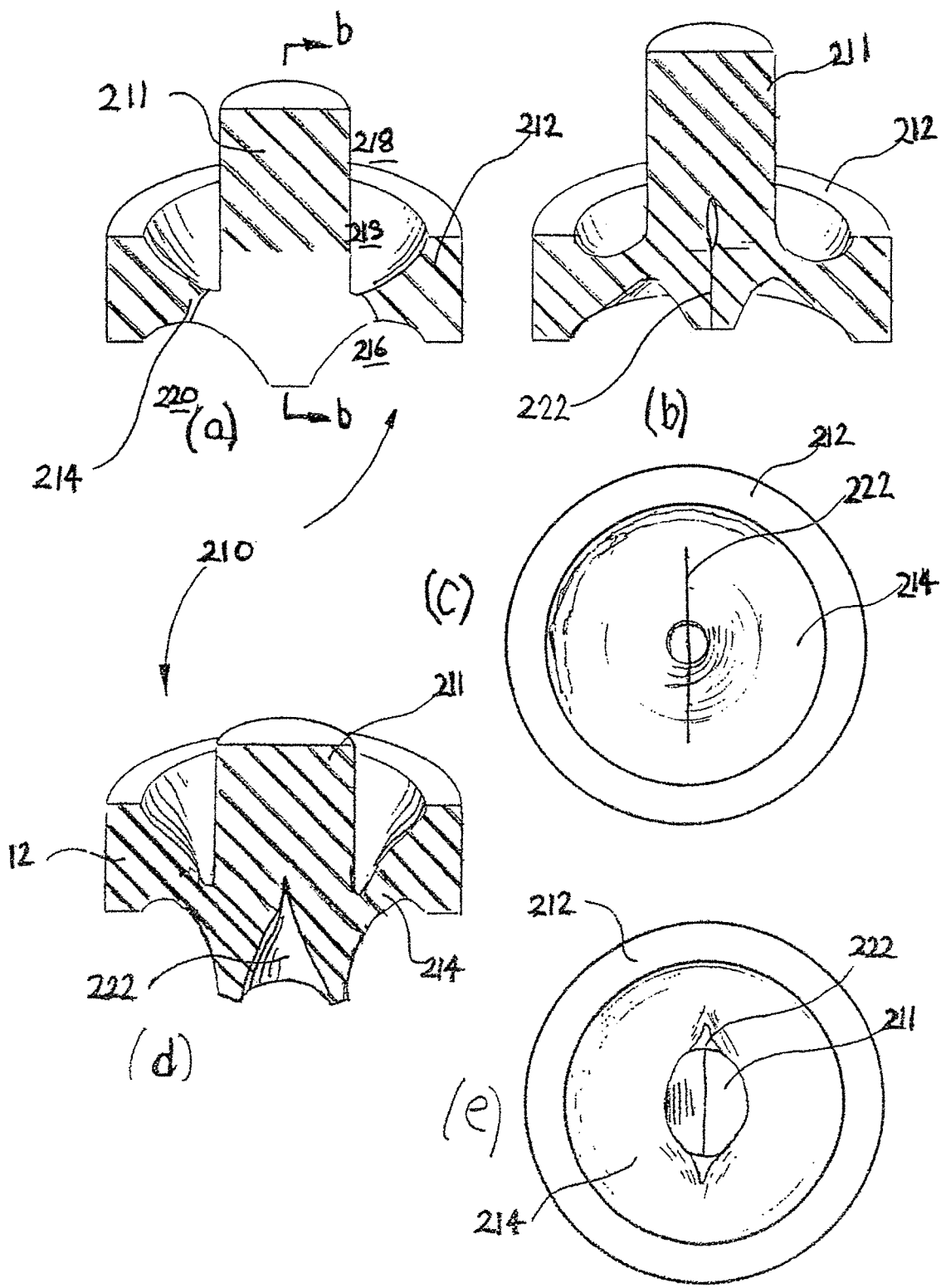
FIGS. 10(a) to (e) are various plan and sectional views of another embodiment of this aspect of the invention shown in both open and closed/pressurised configurations.
Figure 11:
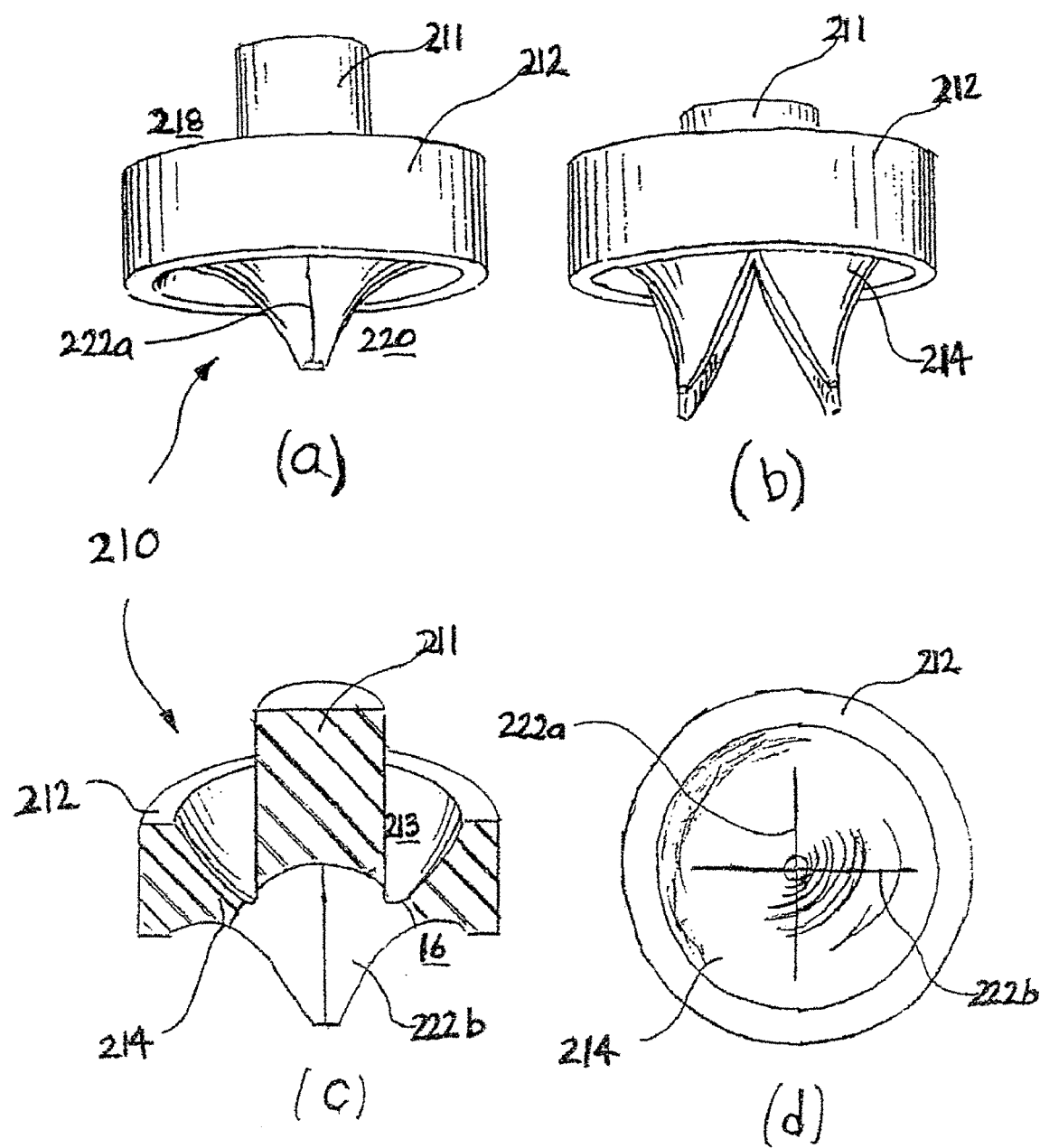

FIGS. 10 and 11 illustrate a variant of the non-return valve of FIG. 9. In order to avoid repetition and for ease of reference like components of this non-return valve as compared to that of FIG. 9 have been designated with the same reference numerals. The non-return valves 210 of these variants include a thicker walled diaphragm 214 at the annular gap 213 between the valve body 222 and the detent 211. Otherwise, the non-return valve 210 of FIGS. 9 and 10 are similar in construction and of a single slit 222 configuration. On the other hand, the non-return valve of FIG. 11 includes a pair of slits 222a and 222b disposed at right angles to one another whilst being co-planar with an axis of the valve 210. The dual slits 222a/b of this example permits increased flow of fluid through the valve 210 particularly in its exhausting or purging condition.

FIGS. 10(a) and (c) depict the valve 210 in its neutral/closed condition. In this condition the resilience of the diaphragm 214 together with the fluid pressure on the high pressure side of the valve 210 effects closure of the collapsible aperture or slit 222. FIG. 10(b) shows the valve 210 in an over pressured condition at around 2000 kPa. The single slit 222 is drawn slightly open in its upper region by the tension exerted by the stressed diaphragm 214. This continued opening of the single slit 222 under excessive pressure vents sufficient fluid until the pressure returns to normal operating conditions and the valve reverts to its neutral/closed condition illustrated in FIGS. 10(a) and (c). The non-return valve 10 shown in FIGS. 10(d) and (e) is in an opened condition wherein the slit aperture 222 is exposed to permit the flow of fluid from the high pressure side of the valve 210. The slit 222 is exposed by depressing the valve actuator or in this example detent 11 axially downward toward the high pressure side of the valve 210. The tension in the diaphragm 214 by depression of the detent 211 urges opening of the slit aperture 222.

FIGS. 11(a) and (c) are perspective and sectional views of the dual slit variant of the non-return valve 210. The valve 210 is in these representations shown in its neutral/closed condition whereby fluid is prevented from flowing from a high to a low pressure side of the valve 210. FIG. 11(d) is an underside plan view of the non-return valve 210 in this closed condition wherein the dual slits 222a/b are sealed together under the effect of both the resilient force of the diaphragm 214 and the pressure of the fluid on the high pressure side of the valve 210. FIG. 11(b) illustrates this dual-slit version of the valve 210 in its open condition wherein the dual slit aperture 222a/b is exposed to permit the flow of fluid in a reverse direction through the valve. The detent 211 is depressed axially toward the high pressure side of the valve 210 so that the valve 210 assumes this opened condition. It will be appreciated that the tension in the diaphragm 214 draws the dual slit apertures 222a/b apart as best represented in FIG. 11(b).

Figure 12:
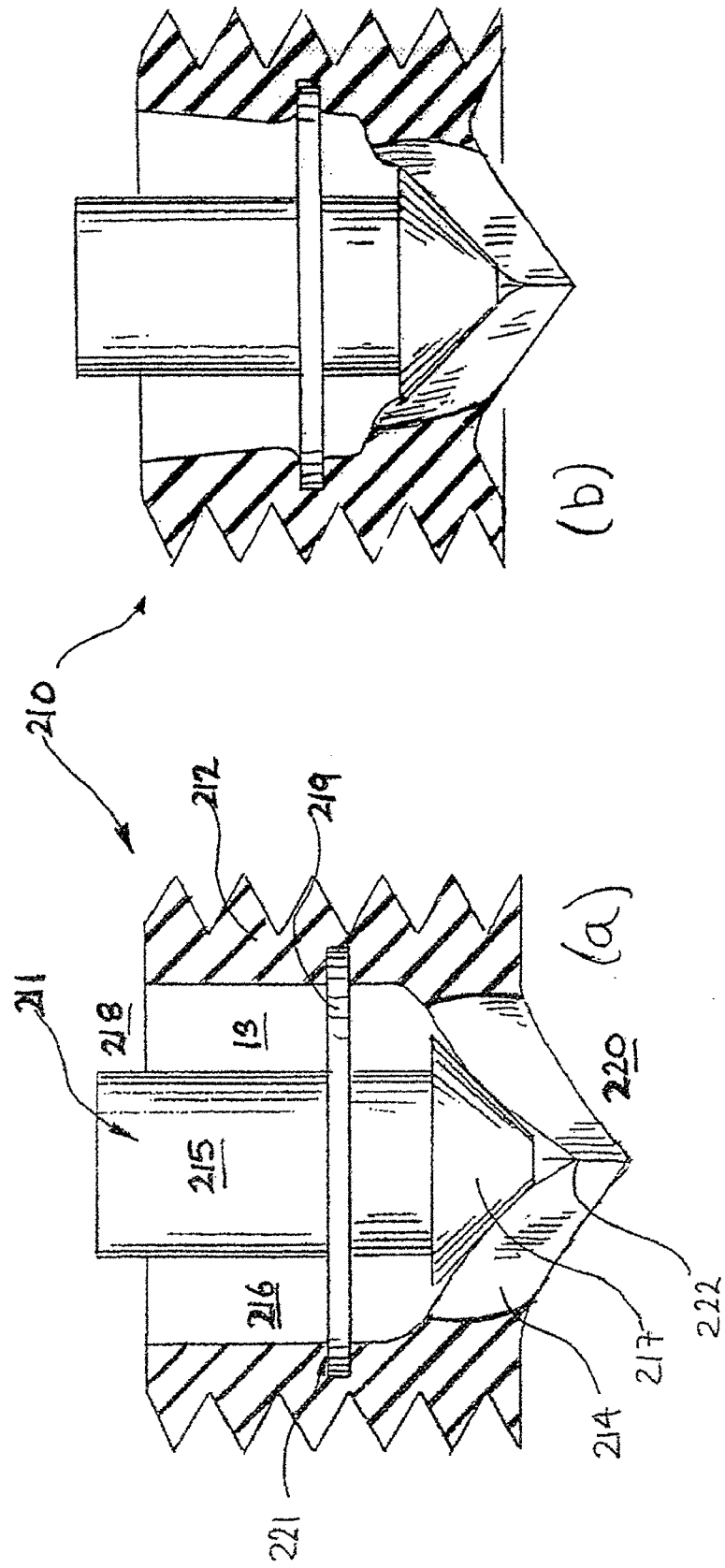
Figure 13:
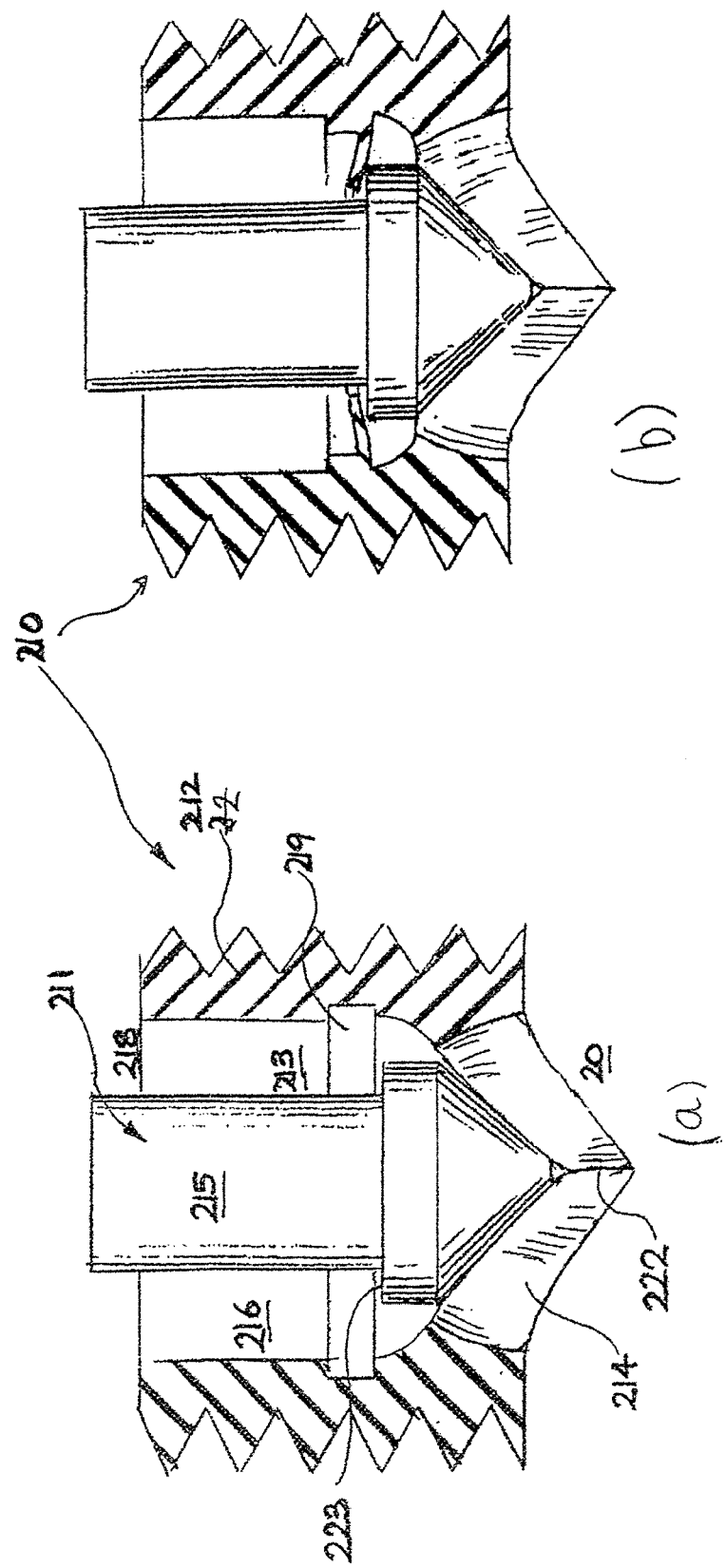
FIGS. 13(a) and (b) are part sectional views of still another embodiment of this aspect of the non-return valve in its "neutral" and pressurised configurations.

FIGS. 12 and 13 illustrate alternative embodiments of the preceding aspect of the non-return valve 210 including an actuator in the form of the detent 211. In these alternative embodiments the detent assembly 211 is fabricated separate from the remainder of the valve 210. The detent assembly 211 of FIG. 12 includes an elongate member 215 having at one end a conical-shaped engaging surface 217 being configured to abut the diaphragm 214 at its inlet side. The detent assembly 211 includes a retaining element or ring 219 fixed to or formed integral with the elongate member 215 and being adapted to engage an annular recess 221 formed in an inner wall of the valve body 212. The detent assembly 211 is retractably inserted into the valve body 212 prior to, in this example, its screw threaded installation. FIG. 12(a) shows the non-return valve under 0 differential pressure across the valve diaphragm 214 whereas FIG. 12(b) schematically depicts the valve 210 with a relatively high pressure of around 1000 kPa exerted on the high pressure side of the valve 210.

FIG. 13 illustrates a non-return valve 210 similar in construction to that of FIG. 12 but wherein the detent assembly 211 includes the elongate actuator member 215 axially and slidably received within the retaining element 219 which is retractably received within the valve body 212. In this example the conical-end of the actuator member 215 includes a shoulder 223 which abuts the retaining element or ring 219. FIG. 18A shows this variant of the valve 210 with approximately 0 differential across the valve diaphragm 214 whereas FIG. 13(B) shows a pressurised condition at around 2000 kPa on the high pressure side of the valve 210. The retaining ring 19 is designed to deflect under this pressurised condition whilst the diaphragm 214 bears against the conical-shaped engaging surface 217 of the detent assembly 211.

Figure 14:
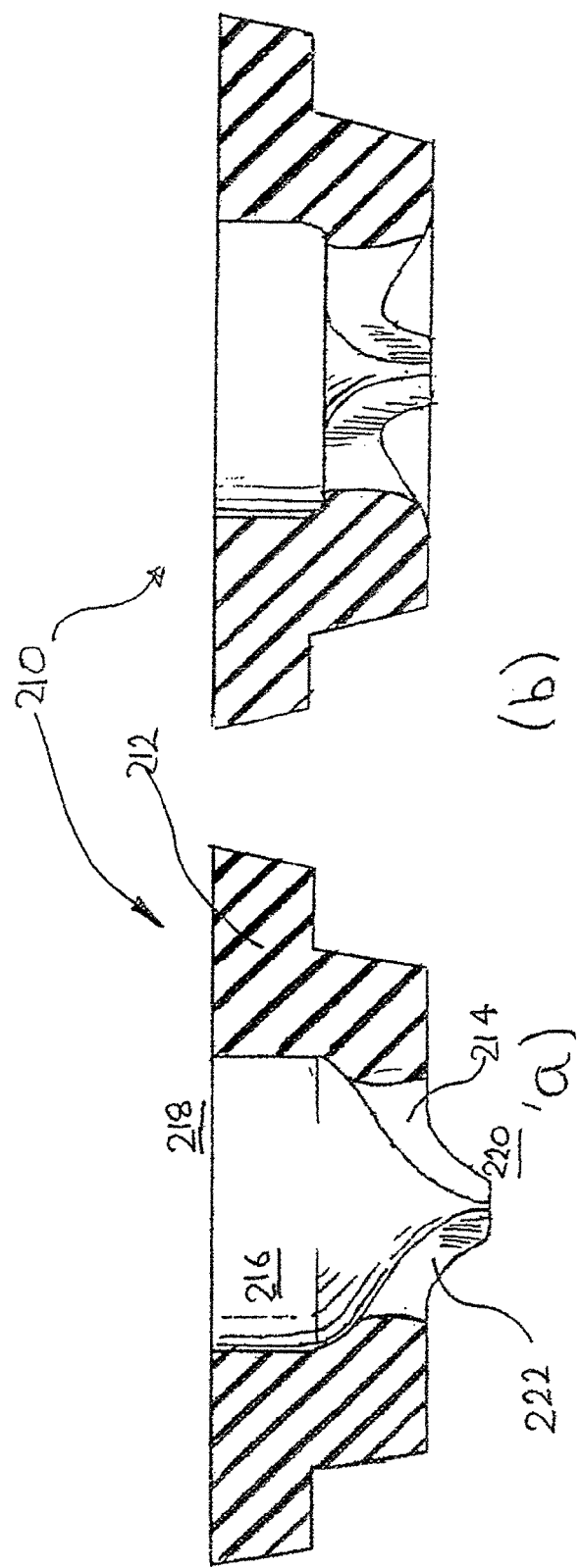
FIGS. 14(a) and (b) are sectional views of a pressure relief valve of an embodiment of a third aspect of the invention shown in its various working configurations.

FIG. 14 depicts various sectional views of a pressure relief valve 210 according to another aspect of the invention. For example, such a pressure release valve may be used to release excessive pressure and thereby prevent destyruction. The pressure relief valve is essentially low profile or squat and a heavy walled version of the previously described non-return valve. Similar components/features of this pressure relief valve 210 have been designated with the same reference numeral as the corresponding feature of the non-return valve. The pressure relief valve 210 of FIGS. 14(a) and (b) is of a single slit configuration whereas the valve 210 of FIGS. 15(a) and (b) are fabricated in a dual slit configuration. FIGS. 14(a) and (b) show the pressure relief valves 210 in a relaxed condition at zero differential pressure across the diaphragm whereas FIGS. 15(a) and (b) depict the valve 10 venting at an excess pressure of around 440 kPa. The pressure relief valve 210 is designed so that an axial deflection of the diaphragm 214 toward the inlet side of the valve 210 effects partial exposure of the collapsible slits 222 to vent excessive pressure on the high pressure side of the valve 210. The resilient forces exerted by the conical-shaped diaphragm 214 thereafter draws the diaphragm 214 towards its passive or neutral condition as depicted in FIGS. 14(a) and 15(a). The pressure relief valve 210 can thus be designed, for example by material selection and/or configuration of the conical diaphragm, to vent or release pressure at a predetermined value.

Figure 16:
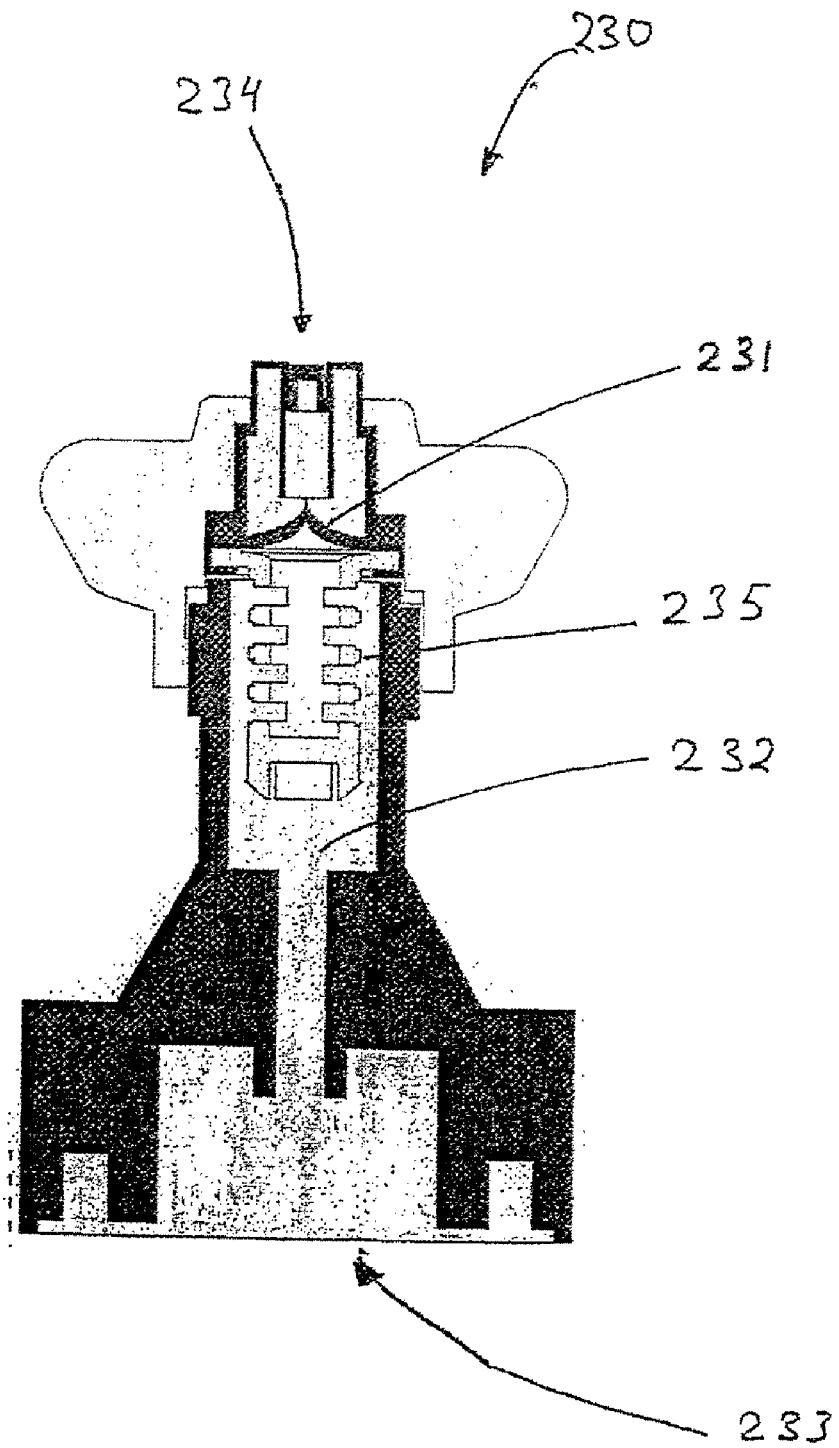
FIG. 16 shows a sectional view of a pressure relief valve of a further embodiment of a fourth aspect of the invention.

FIG. 16 shows a spray nozzle assembly 230 that includes a pressure release valve 231. The assembly may, for example be used for irrigation purposes. The assembly 230 comprises a fluid passage way 232 having an inlet 233 and a nozzle 234 which provides a fluid outlet. Above a predetermined fluid pressure in the passage way 232, the valve 231 opens and fluid flows through the passage way 232, through the filter 235 and exits through the nozzle 234. In this assembly the valve 231 comprises a diaphragm that is oriented in a reverse direction and towards the low pressure region. The usage of the pressure release valve 231 relates to significant practical advantages as the number of moveable parts it the assembly 230 is significantly reduced compared with irrigation assemblies known in the art. Therefore, production costs may be reduced. Further, the simplicity of the valve also reduces the likelihood of residue built up which is a known problem in the art, in particular if the fluid comprises solutes.

Figure 17:
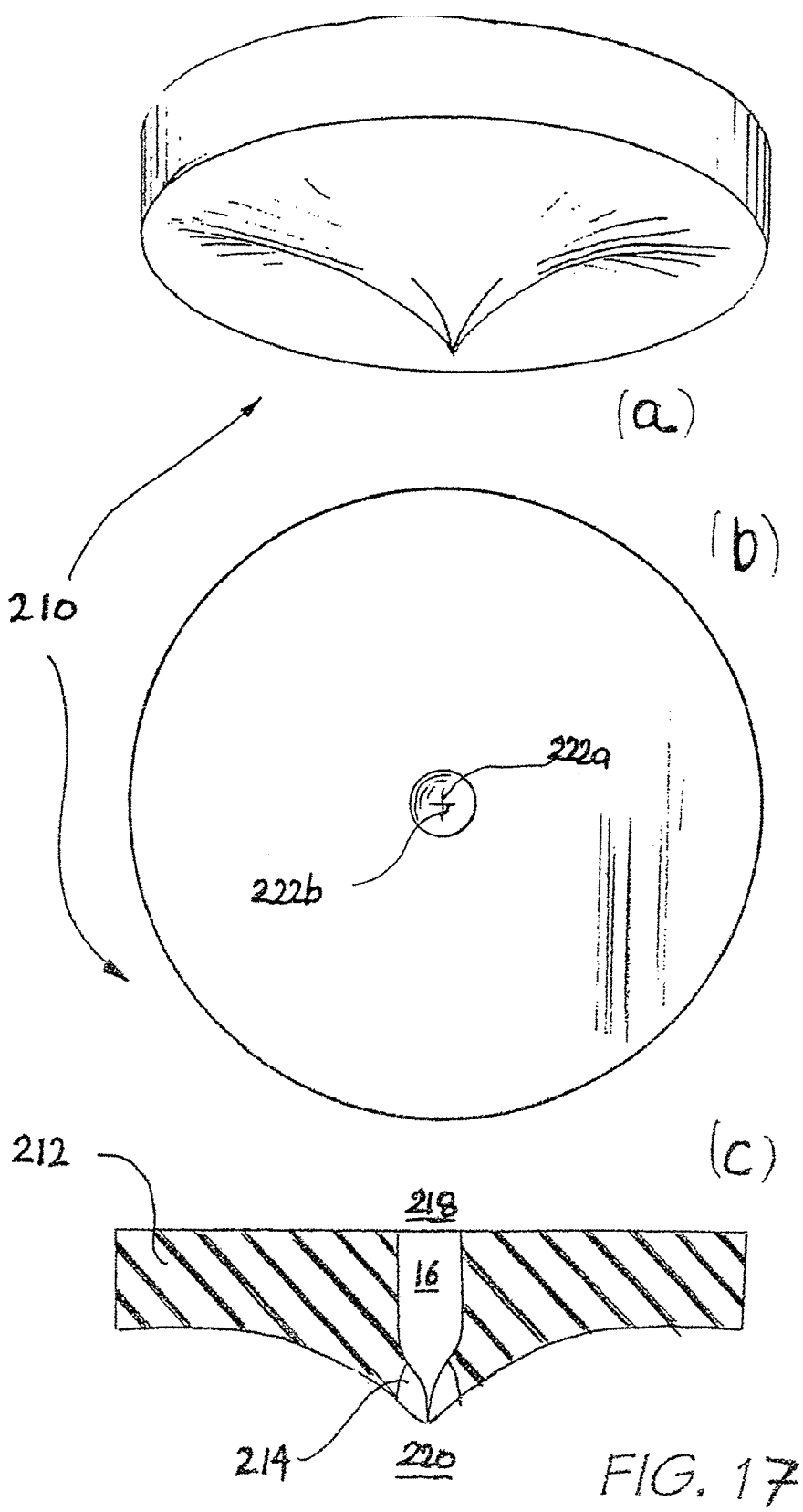
FIGS. 17(a) to (c) are perspective plan and sectional views of a high pressure non-return valve according to a fourth aspect of the invention.

FIG. 17 shows a high pressure non-return valve 210 according to yet another aspect of the invention. The non-return valve 210 of this embodiment is configured for relatively high pressure applications such as those exceeding 400 kPa, for example this valve 210 has application in a sports ball. The valve 210 is still of the same general construction as that of the previous embodiments except that it is relatively squat in sectional profile and includes a relatively small diameter fluid passageway 216. The ball valve 210 of this example includes a conical-shaped diaphragm 214 of a dual slit 222a/b configuration. The applicant conducted pressure testing on a prototype of the high pressure non-return valve 210. In these tests the valve 210 maintained a pressure of 425 kPa for 1100 hours. These actual tests were consistent with and validated data obtained from computational modelling performed on a corresponding valve.

Figure 15:
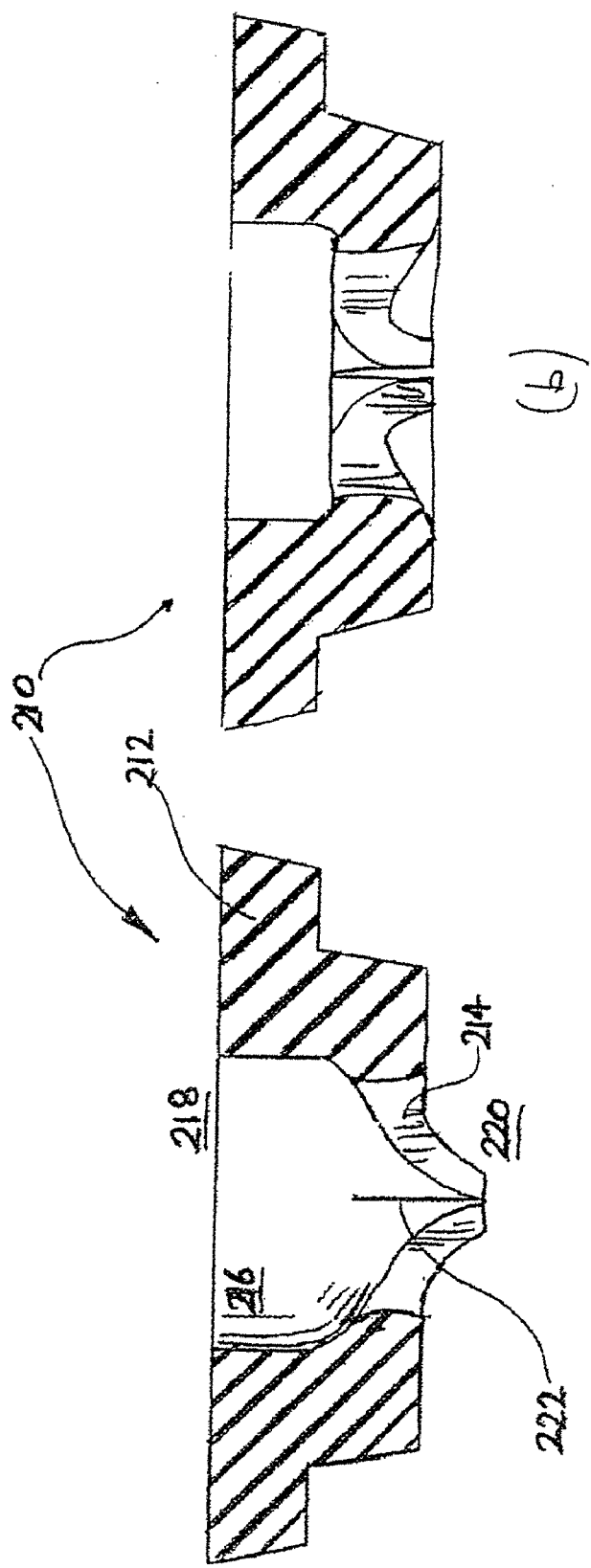
FIGS. 15(a) and (b) are sectional views of a pressure relief valve of an embodiment of a third aspect of the invention shown in its various working configurations.
Figure 18:
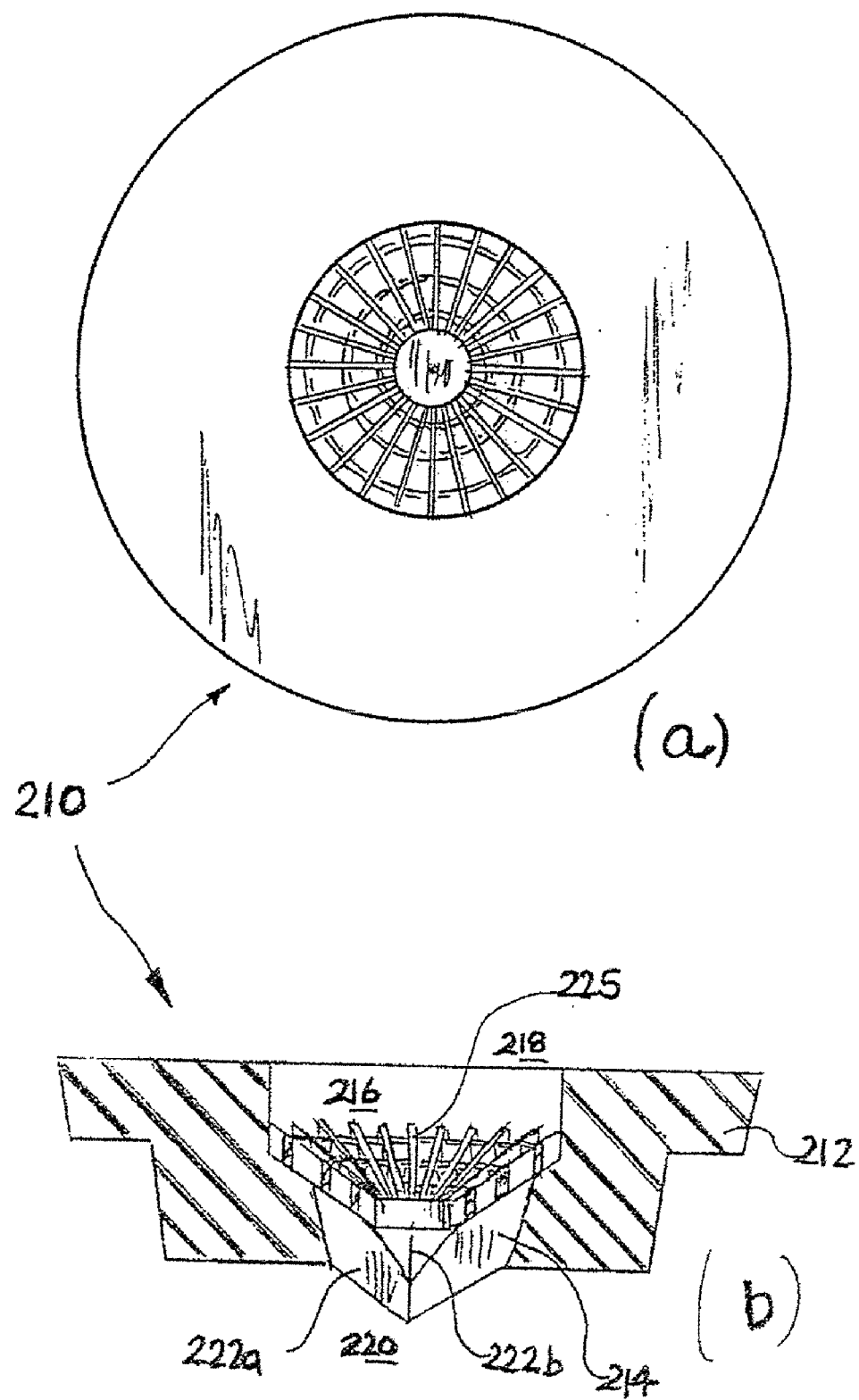
FIGS. 18(a) and (b) are plan and sectional views of a variant of the high pressure non-return valve.

FIG. 18 depicts a high pressure non-return valve which is similar in construction to the pressure relief valve 210 of FIGS. 14 and 15 except that it is not designed for venting. The non-return valve 210 is of the dual slit 222a/b configuration and includes a reinforcing member in the form of a conical-shaped cage 225. The cage 225 is shaped generally complementary to an inlet side of the diaphragm 214 and is press-fit within the valve body 12 on an inlet side of the diaphragm 214. The reinforcing member or cage 225 includes an innermost ring-shaped member connected to a series of larger diameter and coaxially disposed ring members via radially extending spokes. The innermost ring member is sized to permit the passage of a nozzle or the like for purging or filling via the valve 210. The reinforcing member 225 is designed to support the valve diaphragm 214 so that increased pressure can be applied to its high pressure side without inversion of the diaphragm 214. Very high relative pressure may be required to open the valve and permit pressure release. In all embodiments the diaphragm may also function as a seal and seal the valve body. This has the advantage that because of this secondary function of the diaphragm an o-ring seal may be replaced which simplifies the design.

Components of the valve 210 including the diaphragm can be manufactured by injection moulding and reference is made to international patent application WO 00/77429.

Now that valves according to preferred embodiments of the third and fourth aspects of the present invention have been described, it will be apparent to those skilled in the art that the non-return valve, pressure relief valve and permeable membrane have at least the following advantages:
i) the non-return and pressure relief valves are relatively simple in construction;
ii) the non-return valve is effective in operation relying on fluid pressure for opening, and valve membrane characteristics and design for closure; and
iii) the non-return and pressure relief valves are relatively inexpensive to manufacture.

Those skilled in the art will appreciate that the invention described herein is susceptible to variations and modifications other than those specifically described. For example, injection moulding is merely one exemplary technique of forming the non-return valves. The diaphragm may be constructed of practically any resiliently flexible material which in a collapsed condition obstructs the collapsible aperture to prevent flow across the valve or membrane. The non-return valves may extend to applications other than those described above. For example, the fail-safe non-return valve may be connected across the skin of a ship's hull and provide a means of quick evacuation where the human body can slip through dual or multiple diaphragm valves.

All such variations and modifications are to be considered within the scope of the present invention the nature of which is to be determined from the foregoing description.

It is to be understood that, the international patent application WO 00/77429 to which reference is made does not constitute an admission that this international application forms a part of the common general knowledge in the art, in Australia or any other country.

The invention claimed is:

1. A valve comprising:
a valve body having an inlet opening and an outlet opening interconnected by a fluid passageway having a flow aperture;
a diaphragm being constructed of a resiliently flexible material and located across the flow aperture and including a collapsible aperture which inhibits flow from the outlet to the inlet openings via the flow aperture in a reverse flow direction; and
a valve actuator for influencing the flow from the inlet to the outlet, the valve actuator comprising a plunger together with a compression spring which urges the plunger into sealed abutment with the diaphragm.

2. The valve as claimed in claim 1 wherein the diaphragm is disposed about the flow aperture and the valve actuator is at least in part movably coupled to the valve body and arranged to operatively cooperate with the diaphragm to effect closure of the flow aperture to prevent flow from the inlet to the outlet openings in a forward flow direction.

3. The valve as claimed in claim 1 wherein the plunger is elongate and configured at one end to abut the valve diaphragm which is seated about the valve seat.

4. The valve as claimed in claim 1 comprising a plunger guide tube in which the plunger is slidably housed for reciprocating movement.

5. The valve as claimed in claim 4 comprising a solenoid actuator which is located about the plunger guide tube and when electrically activated is designed to effect axial movement of the plunger out of abutment with the diaphragm to permit flow in the forward flow direction.

6. The valve as claimed in claim 2 wherein the diaphragm is shaped about its periphery substantially complementary to a recess formed around the flow aperture, the recess being for seating of the diaphragm relative to the flow aperture.

7. The valve as claimed in claim 6 wherein the diaphragm is fixed or adhered into the recess.

8. The valve as claimed in claim 1 wherein the diaphragm is designed to retrofit to the valve.

9. The valve as claimed in claim 1 wherein the valve is a flow control valve.

10. The valve as claimed in claim 1 wherein the valve actuator is connected to the diaphragm and is configured so that axial movement of the actuator toward the fluid outlet deflects the diaphragm to expose the aperture and allow fluid to flow through the passageway from the inlet to the outlet or the other way.

11. The valve as claimed in claim 1 wherein the diaphragm is in the form of a generally conical-shaped diaphragm having the collapsible aperture located at or adjacent its apex which is orientated in the forward flow direction.

12. The valve as claimed in claim 1 wherein the collapsible aperture is in the form of one or more slits each being formed through an axis of the valve.

13. The valve as claimed in claim 1 being constructed of a resiliently flexible polymeric material.

14. The valve as claimed in claim 13 wherein the polymeric material is an elastomer.

15. The valve as claimed in claim 14 wherein the elastomer is a rubber material.

16. The valve as claimed in claim 13 wherein the polymeric material is a nylon-based material.

17. The valve as claimed in claim 1 wherein the diaphragm also has a sealing function.

18. A valve comprising:
a valve body having an inlet opening and an outlet opening interconnected by a fluid passageway having a flow aperture;
a diaphragm being constructed of a resiliently flexible material and located across the flow aperture and including a collapsible aperture which inhibits flow from the outlet to the inlet openings via the flow aperture in a reverse flow direction; and
a valve actuator for influencing the flow from the inlet to the outlet, the valve actuator comprising an elongate member formed integrally and generally coaxial with the valve diaphragm and being configured so that axial movement of the actuator toward the fluid outlet deflects the diaphragm to expose the aperture and allow fluid to flow through the passageway.

19. The valve as claimed in claim 10 wherein the collapsible aperture is in the form of one or more slits each being formed through an axis of the valve and the valve diaphragm is formed integrally with the valve body.

20. The valve as claimed in claim 10 wherein the valve body is configured to retrofit to an existing valve stem.

21. The valve as claimed in claim 10 wherein the valve body is designed to be sealably inserted into a flow line.

22. A high pressure non-return valve comprising:
   a valve body including a fluid passageway which defines a fluid inlet and a fluid outlet located on a low pressure and high pressure side of the valve respectively;
   a valve diaphragm being connected across the fluid passageway and including a collapsible aperture, said diaphragm being constructed of a resiliently flexible material and being configured so that pressure imposed on the high pressure side of the valve promotes closure of the collapsible aperture to prevent fluid flowing in a reverse direction toward the inlet; and
   a reinforcing member being disposed across the valve body and designed to operatively engage the diaphragm on its low pressure side whereby the reinforcing member restricts deflection of the diaphragm when a relatively high pressure is applied on the high pressure side of the diaphragm thus maintaining closure of the collapsible aperture and the valve.

23. The high pressure release valve as claimed in claim 22 wherein the valve diaphragm is generally conical-shaped having its apex directed to the outlet and the high pressure side of the valve.

24. The high pressure release valve as claimed in claim 22 wherein the reinforcing member is conical-shaped and configured to nest within the fluid passageway adjacent the diaphragm on its inlet side.

25. The high pressure release valve as claimed in claim 24 wherein the conical-shaped member comprises a plurality of fluid openings to permit the passage of fluid.

* * * * *